April 7, 1970  K. BRUNELL ET AL  3,504,446
ANSWER SYSTEM FOR TEACHING MACHINES
Filed May 31, 1967  2 Sheets-Sheet 1

INVENTORS
KARL BRUNELL
VLADIMIR PAUL HONEISER
BY
ATTORNEY

United States Patent Office 3,504,446
Patented Apr. 7, 1970

3,504,446
ANSWER SYSTEM FOR TEACHING MACHINES
Karl Brunell, Livingston, and Vladimir Paul Honeiser, Lawrenceville, N.J., assignors, by mesne assignments, to Westinghouse Learning Corporation, New York, N.Y., a corporation of Delaware
Filed May 31, 1967, Ser. No. 642,483
Int. Cl. G09b 7/02
U.S. Cl. 35—9                                      4 Claims

ABSTRACT OF THE DISCLOSURE

A teaching machine with student constructed answers entered on an alpha-numeric keyboard. Operation of particular keys and groups of key are counted on a set of single-stage binary elements which thus indicate the count only as odd or even. The correct answer is encoded as a combination of the binary states. A supplementary register counts the aggregate or total key operations, which is compared with the correct total.

---

This invention relates to teaching machines of the type having provision for the entry of constructed answers by sequential operational of actuators of a keyboard or similar alpha-numeric entry provision.

As more fully discussed in the copending application Ser. No. 642,491 of Harvey J. Brudner assigned to the same assignee and filed simultaneously herewith, great simplification of constructed-answer teaching machines may be achieved by recognizing and utilizing the fact that evaluation of answers for correctness does not require the information-storage capacity which would be required for retranslation of the keyboard actuations of the student into a form capable of being understood. As disclosed and claimed in that application, answer systems for teaching machines may advantageously evaluate answers by mere extraction of information regarding the student manipulation of the keyboard keys which is wholly insufficient to permit reconstruction of the intended answer of the student, the teaching function being substantially fully served so long as there is a very low probability of evaluating a randomly-selected or erroneous answer as correct, but without possibility of evaluating a correct answer as incorrect. The correctness of the answer may, for teaching-machine purposes, be evaluated by merely counting the number of operations of particular keyboard actuators, or groups of actuators. The present invention may be described as an improvement flowing from the further recognition that the storage and utilization of the actuator-responsive counts may, without impairing operation of the machine, be constructed with insufficient capacity for retranslation into accurate numerical values, i.e., that the probability considerations involved permit the dropping or discarding of information regarding the key-actuation counts, similar to the manner in which these counts themselves fail to record information sufficient for reconstruction of the order, etc., of the key-operations which produced them.

In the present invention, the counts of the key actuations are registered in register elements of small capacity, incapable of reflecting the true count, and are merely recycled to produce the ultimate combination of states representative of the entry made by the student in constructing his answer. In the embodiment hereinafter to be described, the register elements are merely binary, thus being capable only of indicating whether the number of actuations registered thereon is odd or even. This construction is particularly advantageous in that it permits the encoding of the correct answer information in terms of a single binary bit, such as transparency or opacity of a film segment, for each register. However, it is of course possible to employ the invention with registers of higher capacity, such as three- state or four-state registers employed for counting larger numbers of key actuations and recycled upon each attaining of full capacity.

The recycling of the low-capacity registers of course introduces a counting ambiguity or uncertainty as regards the number of recyclings represented by the final register state. In accordance with the further teachings of the invention, this uncertainty is eliminated to produce an overall accuracy, for practical purposes, essentially identical with that provided by registers having a capacity sufficient to accommodate the highest count for which the system is designed, but in a manner greatly simplifying the construction. The low-capacity registers on which the individual or group character counts are recorded, at least partially by recycling, are supplemented by at least one register of higher capacity, registering a count indicative of the total number of characters entered. The comparison of this count with the number of characters in the correct answer resolves the recycling ambiguity of the individual character-group counts in a manner which is for practical purposes fully equivalent to the accuracy obtained by use of individual registers each sufficient to accommodate the maximum count to be encountered.

A variety of manners of implementing the principles of the invention as just described may of course be devised. Although primarily designed for teaching devices in which the sole manual manipulation is the student operation of the keyboard and an associated control panel, and so illustrated in the embodiment to be described, the general principles can obviously be employed for simplification of comparison of constructed teaching-machine answers and similar constructed entries employing lesser automation in one or more of the steps following the operation of the keyboard by the student, for example where the answer evaluation is not performed immediately and automatically, but answers are recorded and later graded by a teacher employing one of the comparison techniques of the type heretofore restricted to multiple-choice student answer entry.

Further aspects of the invention will best be understood by consideration of the embodiment thereof illustrated in the annexed drawing, in which.

Figure 1:
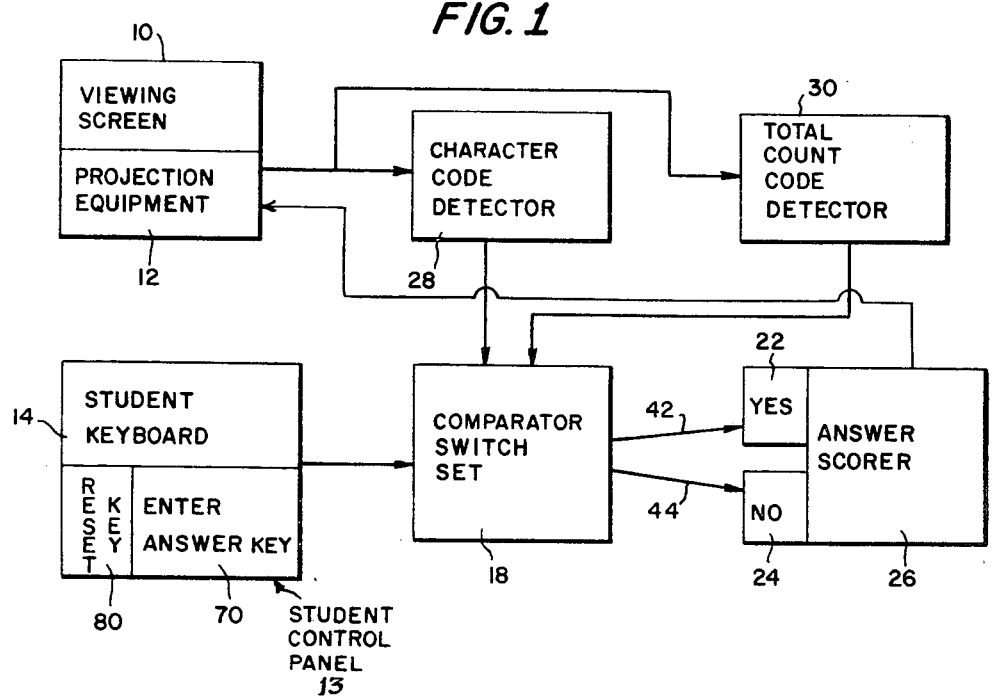
FIGURE 1 is a schematic block diagram of a motion-picture teaching machine embodying the invention.

As may be seen in FIGURE 1, the illustrated teaching machine has a viewing screen 10 associated with motion-picture projection equipment 12. A student control-panel 13 includes a student keyboard 14 for construction of answers, an enter-answer key or button 70, and a reset key or button 80. Correct answers are encoded on the film and detected in a manner hereinafter to be described. If the student makes an error in operating the keyboard (or changes his mind as to the correct answer in the midst of construction of the answer), his answer may be erased or cleared by actuation of the reset key 80. Upon completion of the answer, and operation of the enter-answer key 70, the student answer and the correct answer are compared in a comparator 18 and, dependent upon the result of the comparison, there is produced an output 42 or 44 to a "Yes" or "Correct" indicator 22 or a "No" or "Wrong" indicator 24 of a scorer 26, which in turn, dependent upon the correctness of the answer, selects the next operation of the projection equipment 12.

Figure 2:
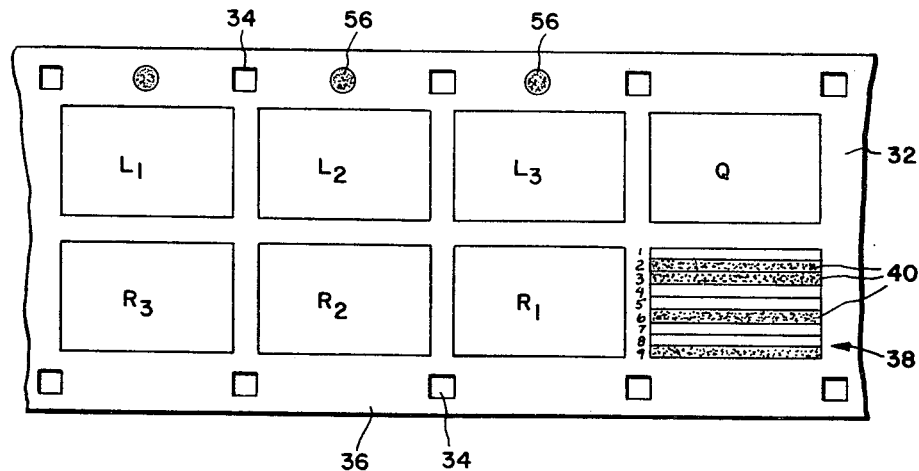
FIGURE 2 is a more or less schematic view of a film employed in the teaching machine.

As seen in FIGURE 2, the film 32 has a main lesson track bearing a series of lessons (only one being illustrated), each having a dynamic lesson sequence schematicaly indicated at $L_1$, $L_2$, $L_3$, followed by a statically presented question Q. There is also a remedial track for dynamic presentation of remedial material on reversely sequenced frames $R_1$, $R_2$, $R_3$, upon entry of an incorrect answer. As disclosed in U.S. Patent No. 3,408,-749 Harvey J. Brudner, the presentation of the remedial track is followed by repetition of at least the end portion of the lesson, to form an overall remedial "loop" in the event of wrong answer. Sound tracks, not illustrated, are preferably recorded on the margins 36 bearing the film sprocket holes 34.

The film 32 bears encoded information as to the correct answer to each question Q. Simultaneously with the display of the question Q, there is internally projected a character code 38 formed by an aperture mask consisting of opaque or transparent bars or stripes 40. Each bar or stripe is identified with one of more keys of the keyboard, and its binary state (opaque or transparent) constitutes a representation of the number of times the corresponding key or keys is or are struck in the correct answer. In accordance with the present invention, this character count information is represented as a binary code which is single-digit, with the second and successive digits, i.e., the "carry" digits, omited. The inherent ambiguity thus created is resolved by auxiliary information, but it will be noted that even without additional provision, the single binary digits provide sufficient information regarding the correct answer to make the probability of accidental or random construction of an answer meeting the "description" contained in the code far lower than in the case of any multiple-choice answer with a reasonable number of alternative choices.

Figure 3:
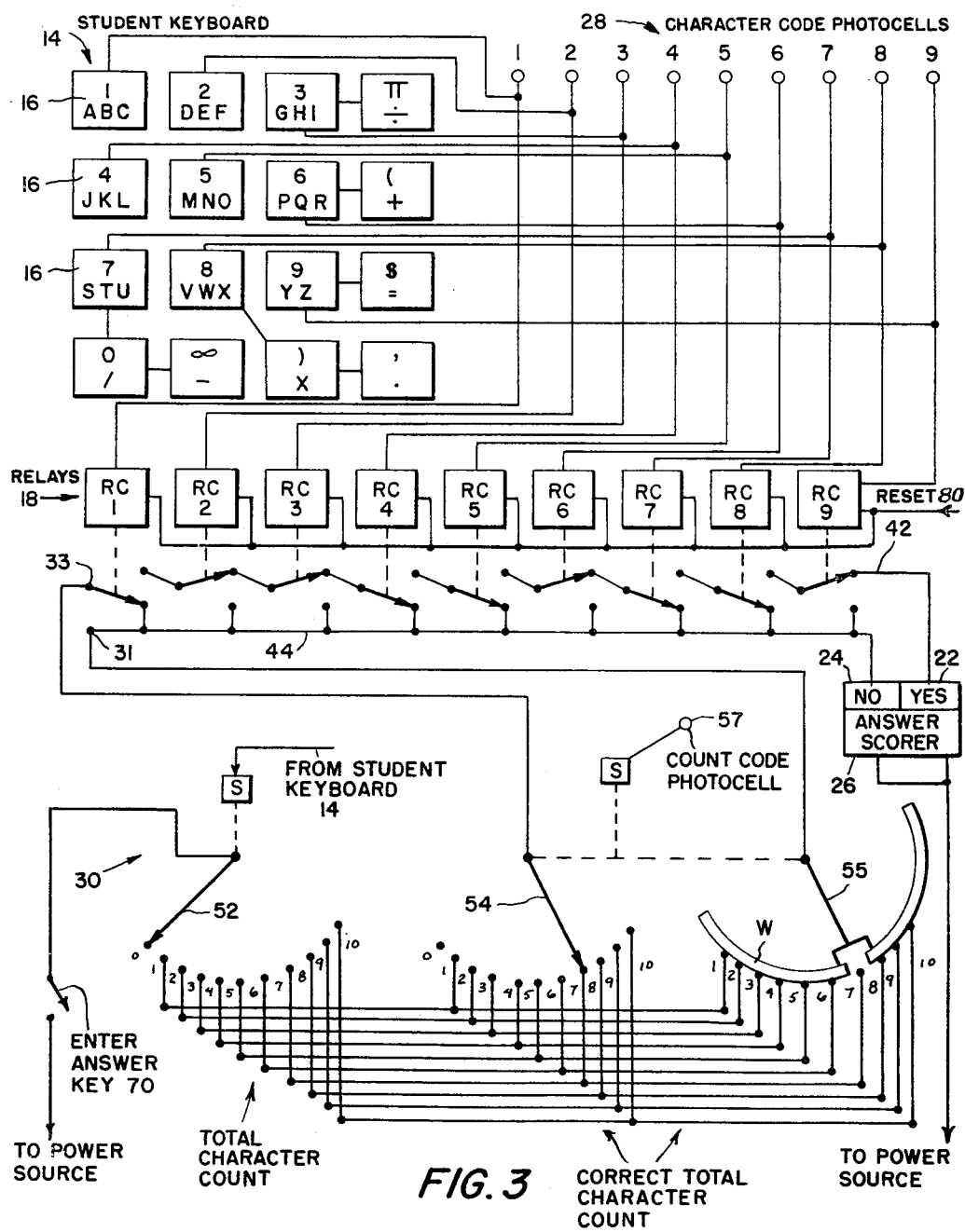
FIGURE 3 is a diagrammatic electrical diagram of an answer entry and comparison system, corresponding to a portion of FIGURE 1.

The answer entry and comparison system is further shown schematically in FIGURE 3. The keys or actuators 16 constituting the keyboard 14 are marked with groups of characters generally similar to the manner of marking of a touch-type telephone keyboard, the number of keys being enlarged to sixteen to accommodate mathematical symbols and similar additions. In a number of instances, the keys are connected together in parallel, so that their operations are indistinguishable as regards registration in the comparator. In the illustrated embodiment, nine binary register elements are used, corresponding to the nine bars or stripes 40 employed in the character count code 38. These nine registers are alternated in state by successive operations of the keys to which they are respectively responsive. The nine counting registers may of course be replaced by a larger or smaller number, the number of registers employed being essentially independent of the number of keys. However, for a general-purpose teaching machine to be used with a large variety of teaching materials, the number of register or counting elements should be greater than four for a reasonably acceptable probability of accidental correct-answer detection.

Each of the keys 16 is desirably connected to add a count in one of the register elements but selected keys may be connected to change the state of more than one register element, and indeed, if so desired, particular keys (such as a space-bar) may be left unconnected entirely.

In the illustrated embodiment, the multistate counting elements upon which the operations of the keys are registered are illustrated as alternating relays 18, reversing state on each actuation of relay coils $RC_1$ through $RC_9$. It will be understood, however, that this illustration is merely exemplary, any known type of binary register elements being usable, such as flip-flop circuits or semiconductor switches.

The relay coils $RC_1$ through $RC_9$ are provided with reset inputs simultaneously actuated by the reset key 80 to establish a standard condition. In addition to being stepped or alternated by key operations, they are also responsive to photocells collectively constituting a character code detector 28, these cells being numbered to correspond with the respective relays or register elements in FIGURE 3. When a light source (not illustrated) is flashed through the answer code 38, selected ones of the relays are reversed in condition. The relay contacts are connected to establish a series circuit between end terminals 33 and 42 to signal a correct answer, the single combination condition of all relay contacts producing such a signal being with all movable contacts in the position illustrated as upward in the drawing. In any other condition of any of the contacts, a circuit is established between the point 33 and a line 44 corresponding to the "No" output line of FIGURE 1.

The actuation of the reset button 80 establishes a standard condition of all of the contacts. The flashing of the light, preferably occuring in response to release of the reset buttons, activates certain of the cells of the detector to reverse the condition of the corresponding contacts. The condition established by the correct answer coding is complementary to the changes of state produced by actuation of the keys corresponding to the correct answer, i.e., the entry of the correct answer produces a series connection between the input at 33 and the "Yes" output at 42. In the case of the binary embodiment illustrated, this complemenary position is produced either by making the "Reset" condition correspond to the "Yes" condition, in which case register elements which are to be actuated an odd number of times are represented by transparent stripes 40, or by making the "Reset" position the "No" position of all movable contacts, in which case the register elements to be actuated an odd number of times are represented by opacity of the corresponding film code stripes 40.

As shown in FIGURE 1, the comparator system of the present invention employs a supplementary total count code detector 30. Suitable light-contrast marks 56 appear on the film, and are read out by a count code photocell 57 as the film is progressed for presentation of the lesson. As schematically shown at 52, 54 and 55, these film indications are employed to establish a condition wherein power is fed to the input point 33 of the relay contacts only when the total or aggregate number of actuations of all keys corresponds to the total count information so encoded. As so schematically shown, the switch 52 is driven from the student keyboard 14 to register the total count of keys struck. The switches 54 and 55 have their stationary contacts interconnected and connected to the corresponding contacts of the switch 52. For any given count of the light-actuated pulses of the total count code, the corresponding stationary contact of the switch 52 is connected to the correct answer input 33 to the binary relay contact circuit, while all other stationary contacts of the switch 52 are connected to the "Wrong" or "No" line 44. The movable contact of the counting switch or stepping relay 52 is connected to one side of the power line or source through the enter-answer key 70, while the other side of the power line or source is connected through the scorer 26 to the "Yes" and "No" lines 42 and 44. When the enter-answer key 70 is closed by the student, either the "Yes" or the "No" indicator is actuated. If the contacts of the relays 18 are in the correct position, and the total character count corresponds to the correct character count, the answer is scored as correct, and progression of the film is recommended in the forward direction. If any one or more of the relays 18 is in the incorrect condition, the answer will be indicated as incorrect even if the total character count at 52 corresponds to the correct character count at 54 and 55. Conversely, if the total character count at 52 fails to correspond to the correct character count at 54 and 55, the answer will be indicated as incorrect even if the relays 18 are in the correct condition as a result of the recycling ambiguity.

Figure 4:
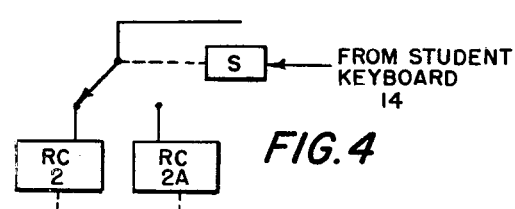
FIGURE 4 is a fragmentary view of an alternate or modified form of the embodiment illustrated.

In FIGURE 4 is illustrated a variant form of the invention employed for limited discrimination of the order of entry of characters, as disclosed and claimed in the concurrently-filed application of Harvey J. Brudner. In this modification, each register relay is capable of being actuated only in response to alternate operations of keys. For purposes of simplicity, the illustration of FIGURE 4 shows the addition of a duplicate set of relay registers, only the added register $RC_{2A}$, which is alternated in operation with $RC_2$, being shown. As more fully explained in the copending application just mentioned, such alternate actuation of registers is advantageously used for certain purposes wherein the reversal of order of adjacent characters is of the essence of correctness or incorrectness of the answer.

It will be obvious that the method and apparatus aspects of the invention embodied in the device schematically illustrated in the drawing may be used in a large number of variant forms, differing both as regards exact manner of use and details of design. Accordingly, the scope of the protection to be afforded the invention should not be determined from the particular embodiment herein described, but should extend to all use of the method and apparatus of the invention as defined in the appended claims, and equivalents thereof.

What is claimed is:
1. In an instructional system the combination of:
   (a) means for presenting lessons and answers following selected of said lessons;
   (b) means for storing the correct encoded answers to said questions;
   (c) student response means including a plurality of input actuators for the construction of multiple character words and similar ordered character student answers by the successive activating of selected of said plurality of said input actuators, at least selected of said plurality of input actuators representing a plurality of characters;
   (d) registering means including a plurality of multistate elements for assuming a predetermined set of states in response to said encoded correct answers and for changing said set of states in response to said student answers and including means for recycling each of said multistate elements on exceeding its registering capacity during the entry of a single multiple-character student answer for comparison with the corresponding correct encoded answer, said recycling being caused at least partially in response to said encoded answers; and
   (e) means responsive to the changed set of states of said plurality of multistate elements for indicating the correctness or incorrectness of said student answers.

2. The combination of claim 1 wherein:
said registering means includes a counting register element having a number of states in excess of any of said plurality of multistate elements and being responsive to more actuations of said input actuators than any of said plurality of multistate elements.

3. The combination of claim 2 wherein:
said correct encoded answers include a representation of the correct entry state of said counter register element with respect to each multicharacter student answer.

4. The combination of claim 3 wherein:
said counter element counts the aggregate number of actuations of particular of said input actuators during the construction of said student answers, and said correct encoded answers include a representation of the aggregate number of characters in the correct answer.

References Cited
UNITED STATES PATENTS

| | | | |
|---|---|---|---|
| 3,052,041 | 9/1962 | Luxton et al. | 35—9 |
| 3,300,876 | 1/1967 | Johannsen | 35—9 |
| 3,355,818 | 12/1967 | Whitehorn | 35—9 |
| 3,355,819 | 12/1967 | Hannah et al. | 35—9 |
| 3,386,187 | 6/1968 | Kilby | 35—9 |

EUGENE R. CAPOZIO, Primary Examiner

W. H. GRIEB, Assistant Examiner